United States Patent
Oh

(10) Patent No.: US 6,173,169 B1
(45) Date of Patent: Jan. 9, 2001

(54) DEVICE AND METHOD FOR MAKING EMERGENCY CALL IN CORDLESS TELEPHONE

(75) Inventor: Tae-Keun Oh, Seoul (KR)

(73) Assignee: Samsung Electronics Co., Ltd. (KR)

( * ) Notice: Under 35 U.S.C. 154(b), the term of this patent shall be extended for 0 days.

(21) Appl. No.: 09/196,060

(22) Filed: Nov. 19, 1998

(30) Foreign Application Priority Data

Nov. 19, 1997 (KR) .................................................. 97-61223

(51) Int. Cl.$^7$ .................................................. H04M 11/00
(52) U.S. Cl. .......................... 455/404; 455/462; 379/51; 379/40
(58) Field of Search .................................. 379/38, 39, 40, 379/41, 42, 43, 44, 45, 51, 48; 455/404, 550, 575, 567, 462, 573

(56) References Cited

U.S. PATENT DOCUMENTS 5,337,342 * 8/1994 Kruger et al. .......................... 379/40
5,575,002 * 11/1996 Mulford .............................. 455/194.1
5,960,357 * 9/1999 Kim ...................................... 455/462

* cited by examiner

Primary Examiner—Daniel S. Hunter
Assistant Examiner—Lana Le
(74) Attorney, Agent, or Firm—Dilworth & Barrese, LLP

(57) ABSTRACT

A cordless telephone for making an emergency call upon sensing separation of a handset from a charger of a base unit. The handset is normally set in the charger in an idle state. A handset sensor detects separation of the base unit from the charger, and a user interface is used to input an emergency mode setting command and a phone number for an emergency call. A memory stores the input phone number for the emergency call, and a telephone answering device generates a voice message annunciating an emergency situation. When the handset is separated from the charger, a controller mutes a speaker, forcedly hooks off the base unit, reads the phone number for the emergency call from the memory, dials the read phone number, and sends the voice message. A microphone can also be enabled in order to transmit the sounds of the emergency situation to a called party.

10 Claims, 4 Drawing Sheets

DEVICE AND METHOD FOR MAKING EMERGENCY CALL IN CORDLESS TELEPHONE

BACKGROUND OF THE INVENTION

1. Field of the Invention

The present invention relates to a cordless telephone, and in particular, to a device and method for making an emergency call in a cordless telephone.

2. Description of the Related Art

In order to provide protection against emergencies, such as a burglary or fire, many dwelling houses have a security system which includes an emergency button connected by wire to a police station or a fire station. In the event of an emergency, one may press the emergency button to notify the authorities of the situation and initiate a response. However, it may not be practical to move to a place where the emergency button is located and then press it in the emergency situation. For example, fire may be interposed between a resident and the emergency button. Also, in the case of an ongoing burglary, one's moving to the emergency button may excite the burglar unnecessarily, creating a dangerous situation.

Many dwelling houses depend upon a security service company. In such a case, a security monitoring device installed in the house notifies the security service company upon detection of emergency situations. However, such security companies typically charge a significant fee for this service.

SUMMARY OF THE INVENTION

It is therefore an object of the present invention to provide a device and method for making an emergency call using a cordless telephone.

To achieve the above object, a device for making an emergency call in a cordless telephone includes a base unit and a handset, wherein the handset is put on a charger of the base unit in an idle state. In the device, a handset sensor senses separation of the base unit from the charger, and a user interface is used to input an emergency mode setting command and a phone number for an emergency call. A memory stores the input phone number for the emergency call, and a telephone answering device generates a voice message enunciating an emergency situation. A controller sets an emergency mode in response to the emergency mode setting command, mutes a speaker, forcedly hooks off the base unit, reads the phone number for the emergency call from the memory, dials the read phone number, and sends the voice message.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF PREFERRED EMBODIMENTS

Reference will now be made in detail to a preferred embodiment of the present invention. In the following description, specific details such as processing flow have been set forth to provide a more thorough understanding of the present invention. However, it will be apparent to one skilled in the art that the present invention is not limited to these specific details. In some cases, detailed descriptions of known functions and constructions have been omitted from the present disclosure for clarity.

Figure 1:
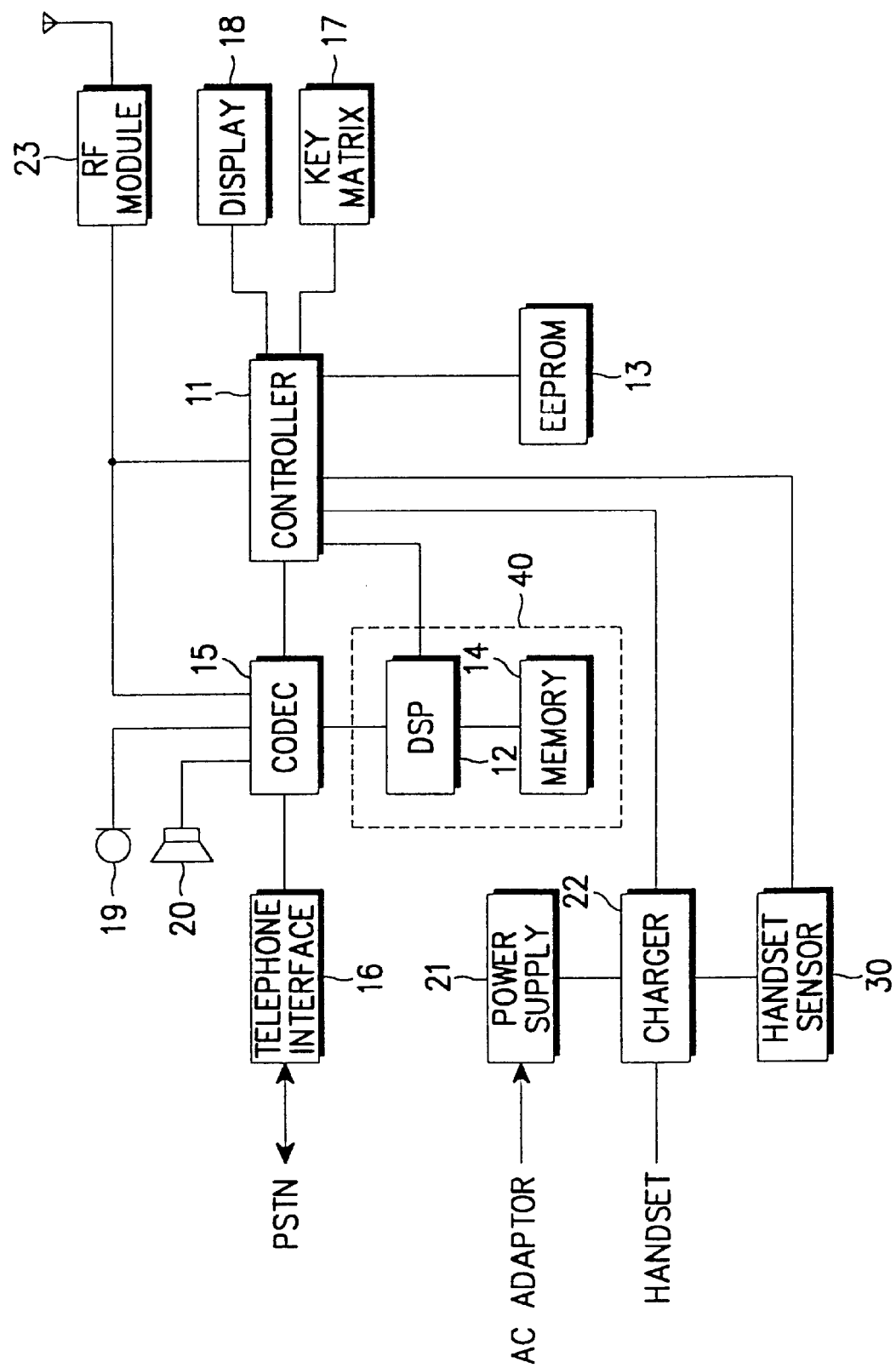
FIG. 1 is a block diagram of a base unit of a cordless telephone according to an embodiment of the present invention.

FIG. 1 illustrates a block diagram of a base unit of a cordless telephone according to an embodiment of the present invention. In FIG. 1, a controller 11 controls the overall operations of the base unit. The controller 11 preferably takes the form of a one-chip microprocessor or microcontroller which includes a ROM (Read Only Memory) for storing a program and a RAM (Random Access Memory) for temporarily storing data generated in the course of executing the program. A non-volatile memory 13, such as an EEPROM (Electrically Erasable and Programmable Read Only Memory), stores a phone number for the emergency call (i.e., a phone number for the police station or the fire station). An RF (Radio Frequency) module 23 provides for wireless communication with a handset (not shown), modulates and up-converts data output from the controller 11 and a voice signal output from a microphone 19 into an RF signal and outputs the RF transmission signal to an antenna. Further, the RF module 23 down-converts and demodulates an RF signal received through the antenna to provide a voice signal to a codec 15 and data to the controller 11.

A telephone interface 16 connected by wire to a PSTN (Public Switched Telephone Network), interfaces various signals (e.g., a ring signal and a voice signal) between the base unit and the PSTN. A telephone answering device (TAD) 40 generates a voice message which notifies a called party (i.e., the police station and the fire station) of an emergency situation through the telephone interface 16 under the control of the controller 11. The TAD 40 generally includes a digital signal processor (DSP) 12 and a memory 14. Here, the memory 14 may be realized by such devices as a flash memory or a magnetic tape.

The voice message may include a verbal indication of the emergency situation (e.g., detection of a robber or detection of a fire) as well as a postal address of the telephone user. Further, the TAD 40 may also include a DTMF (Dual Tone Multi-Frequency) generator (not shown) to send a predetermined DTMF signal indicative of the emergency situation as an alternative to the voice message. A power supply 21 provides a power supply voltage to the base unit and a charger 22. The charger 22, on which the handset 30 is normally placed, charges the handset 30 through a pair of charging terminals. A handset sensor 30 senses when the handset 30 is placed on the charger 22 of the base unit. A user interface, preferably in the form of a key matrix 17 is used to input an emergency mode setting command and the phone number for the emergency call. A display 18 displays an operating status of the base unit under the control of the controller 11.

Figure 2:
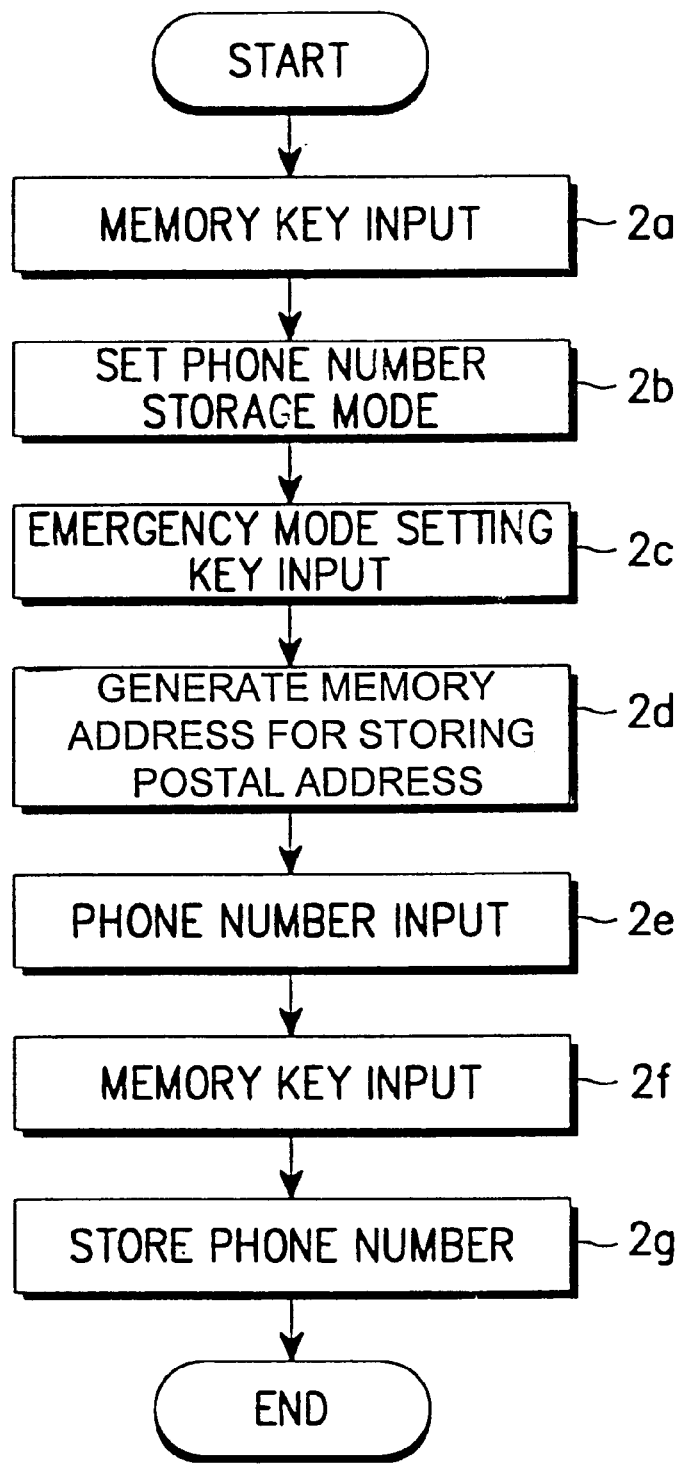
FIG. 2 is a flowchart illustrating a procedure for registering a voice message annunciating an emergency situation according to an embodiment of the present invention.

FIG. 2 is a flowchart illustrating a procedure for registering a voice message for enunciating an emergency situation according to an embodiment of the present invention. Referring to FIG. 2, when the user depresses a memory key (step 2a), the controller 11 sets the base unit in a phone number storage mode (step 2b). If the user subsequently depresses an emergency mode setting key (step 2c), the controller 11 generates an address of the EEPROM 13 at which the postal address of the telephone user is to be stored (step 2d). Next, the controller 11 receives a phone number for the emergency call that the user inputs through the key matrix 17 (step 2e). Subsequently, when the user inputs the memory key, the controller 11 stores the input phone number for the emergency call at the generated address of the EEPROM 13 (step 2g).

Figure 3:
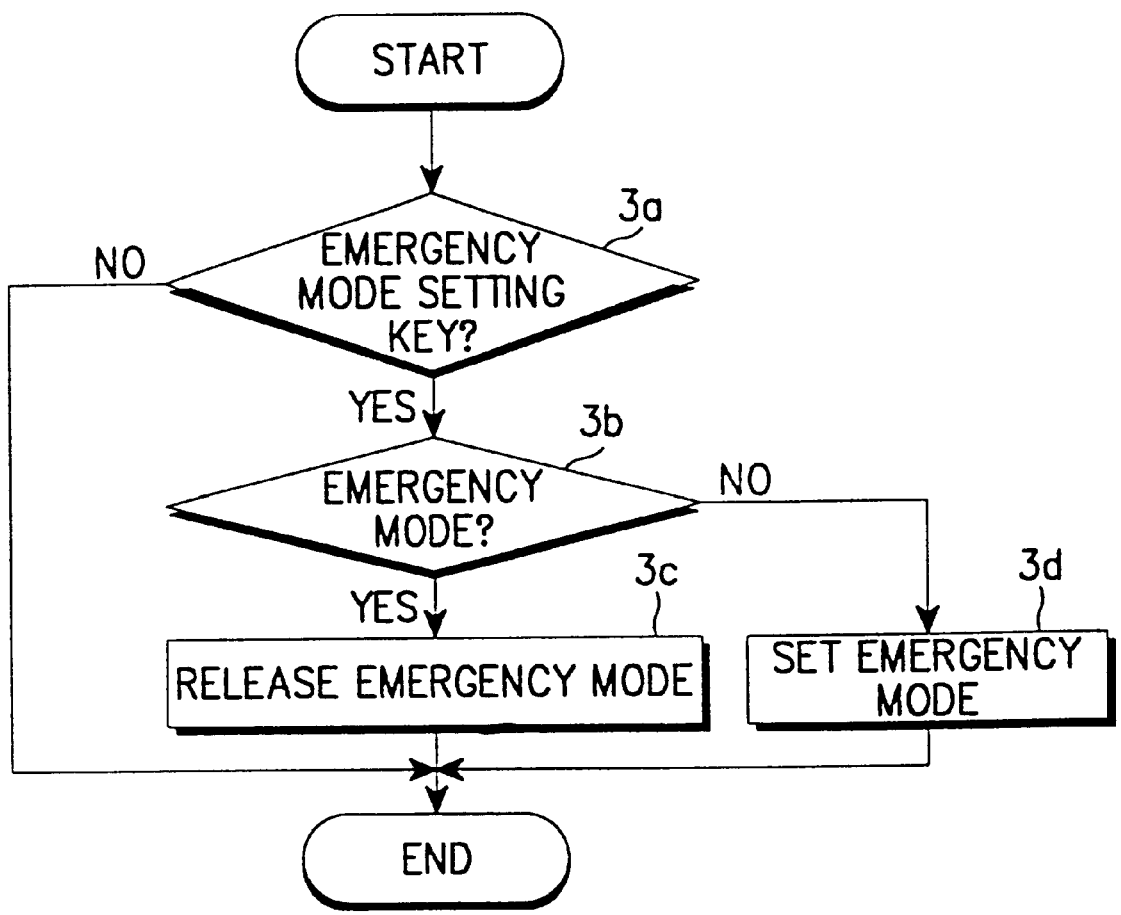
FIG. 3 is a flowchart illustrating a procedure for setting and releasing an emergency mode according to an embodiment of the present invention.

FIG. 3 is a flowchart illustrating a procedure for setting and releasing the emergency mode according to an embodiment of the present invention. Referring to FIG. 3, the controller 11 determines whether the emergency mode setting key is input (or pressed) by the user (step 3a). If it is determined that the emergency mode setting key is input, the controller 11 determines whether the base unit has been already set to the emergency mode or not, by checking a specific flag (step 3b). If it is determined that the base unit has been previously set to the emergency mode, the controller 11 releases the emergency mode. Otherwise, the controller 11 sets the emergency mode (step 3d). That is to say, the controller 11 toggles the emergency mode each time the user presses the emergency mode setting key.

Figure 4:
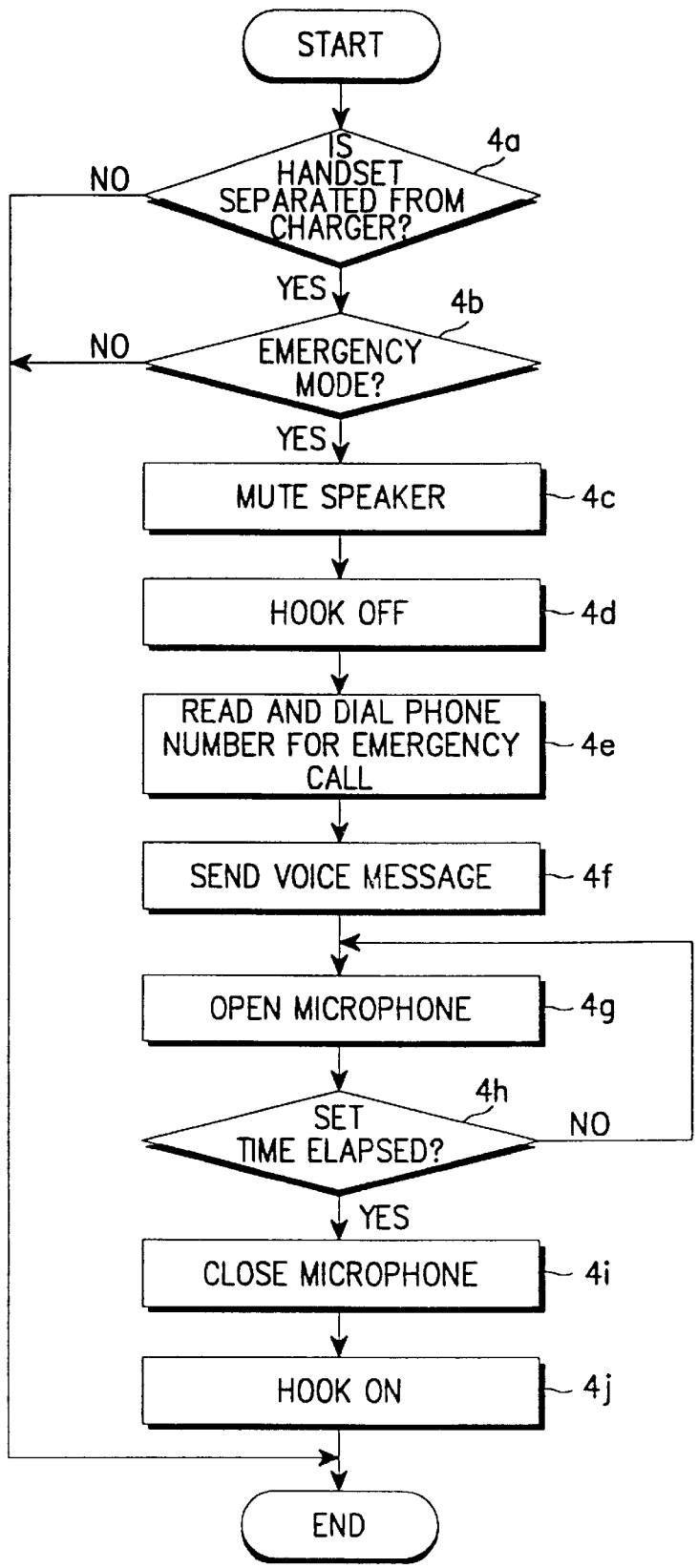
FIG. 4 is a flowchart illustrating a procedure for making an emergency call according to an embodiment of the present invention.

FIG. 4 is a flowchart illustrating a procedure for making an emergency call according to an embodiment of the present invention. Referring to FIG. 4, the controller 11 determines whether the handset is separated from the charger 22 by using the handset sensor 30 (step 4a). In an idle state, the handset is normally placed (or parked) on the charger 22 so that a rechargeable battery of the handset receives a charging voltage from the charger 22 of the base unit. That is, the handset is normally connected to the charger 22 of the base unit through the charging terminals, unless the user picks up the handset to answer an incoming call or make an outgoing call, or otherwise removes the handset from the charger 22.

For example, in the event of an emergency, the user may intentionally remove the handset from the charger 22 of the base unit. The handset sensor 30 then senses separation of the handset from the charger 22 and, when the emergency mode is set, can automatically initiate an emergency call without further user action.

If it was determined in step 4a that the handset is separated from the charger 22, the controller 11 then determines whether the emergency mode is set or not (step 4b). If the emergency mode is set, the controller 11 mutes the speaker 20 (step 4c). Next, the controller 11 seizes the phone line of the PSTN by forcedly placing the base unit in an off-hook state (step 4d) and then accesses the EEPROM 13 to read and dial the phone number for the emergency call (step 4e). Thereafter, the controller 11 determines whether a speech path is formed, i.e., whether a telephone of the other party (e.g., the police station or the fire station) is picked up (i.e., hooked off) (step 4f). If it is determined that the speech path is formed, the controller 11 directs the TAD 40 to read and send the voice message previously stored in the memory 14, thereby notifying the called party of the emergency situation. This operation proceeds through the codec 15 and the telephone interface 16. Subsequently, the controller 11 opens (enables) the microphone 19 so that the sound of the emergency situation are transmitted to the other party through the microphone 19, the codec 15 and the telephone interface 16 (step 4g), thus giving the called party further information regarding the emergency situation. Next, the controller 11 checks whether a preset time (e.g., 30 minutes) has elapsed (step 4h). If the preset time has elapsed, the controller 11 closes (disables) the microphone 19 (step 4i) and then places the base station in an on-hook state, releasing the phone line (step 4j).

As stated above, in the preferred embodiment of the present invention, there is provided a detailed explanation for making an emergency call by a base unit in a cordless telephone having a handset and a base unit. In addition, it is to be appreciated that the present invention can be applied to a portable radio telephone and various changes and modifications are also possible.

In this way, in the event of an emergency, the user may simply remove the handset from the charger of the base unit to automatically perform an emergency call. Further, the base unit of the invention mutes the speaker so that a burglar is not made aware of the ongoing emergency call, and opens the microphone to send the sound of the emergency situation to the called party.

While preferred embodiments of the present invention have been illustrated and described, it will be understood by those skilled in the art that various changes and modifications may be made, and equivalents may be substituted for elements thereof without departing from the true scope of the present invention. Therefore, it is intended that the present invention not be limited to the particular embodiments disclosed as the best mode contemplated for carrying out the present invention, but that the present invention includes all embodiments falling within the scope of the appended claims.

What is claimed is:

1. A device for making an emergency call in a cordless telephone including a base unit and a handset, wherein the handset is put on a charger of the base unit in an idle state, the device comprising:
   a handset sensor for sensing separation of the base unit from the charger;
   a user interface for inputting an emergency mode setting command and a phone number for an emergency call;
   a memory for storing the input phone number for the emergency call; and
   a controller for setting an emergency mode in response to the emergency mode setting command, said controller muting a speaker, forcedly hooking off the base unit, reading the phone number for the emergency call from the memory, dialing the read phone number, and sending a signal annunciating an emergency situation when in said emergency mode and said handset sensor senses separation of the base unit from the charger.

2. A device for making an emergency call in a cordless telephone as defined by claim 1, wherein said annunciating signal is a DTMF signal.

3. A device for making an emergency call in a cordless telephone as defined by claim 1, wherein said notifying signal is a voice message, said device further comprises a telephone answering device for generating said voice message.

4. The device for making an emergency call as claimed in claim 3, wherein the controller enables a microphone for a predetermined time to send a sound of the emergency situation through the telephone interface and the telephone line.

5. A device for making an emergency call in a cordless telephone including a base unit and a handset, wherein the handset is put on a charger of the base unit in an idle state, the device comprising:

a handset sensor for sensing separation of the base unit from the charger;

a user interface for inputting an emergency mode setting command and a phone number for an emergency call;

a memory for storing the input phone number for the emergency call;

a telephone answering device for generating a voice message notifying an emergency situation;

a telephone interface for sending the voice message through a telephone line; and a controller for setting an emergency mode in response to the emergency mode setting command, said controller muting a speaker, forcedly hooking off the base unit, reading the phone number for the emergency call from the memory, dialing the read phone number, and sending the voice message when in said emergency mode and said handset sensor detects separation of the base unit and charger.

6. The device for making an emergency call as claimed in claim 5, wherein the controller enables a microphone for a predetermined time to send a sound of the emergency situation through the telephone interface and the telephone line.

7. A method for making an emergency call in a cordless telephone including a base unit and a handset, wherein the handset is put on a charger of the base unit in an idle state, the method comprising the steps of:

determining whether the handset is separated from the base unit;

determining whether the base unit is set to an emergency mode, if the handset is separated from the base unit;

muting a speaker and forcedly hooking off the base unit, if the base unit is set to the emergency mode;

reading a phone number for the emergency call from a memory, and dialing the read phone number; and sending a message annunciating an emergency situation.

8. The method for making an emergency all as claimed in claim 7, wherein said annunciating message is a voice message stored in a telephone answering device.

9. The method for making an emergency call as claimed in claim 7, wherein said annunciating message is a DTMF message.

10. The method for making an emergency call as claimed in claim 7, further comprising the step of enabling a microphone for a predetermined time to send a sound of the emergency situation.

\* \* \* \* \*